(No Model.)
J. CARPENTER.
VEHICLE WHEEL.
No. 443,745. Patented Dec. 30, 1890.
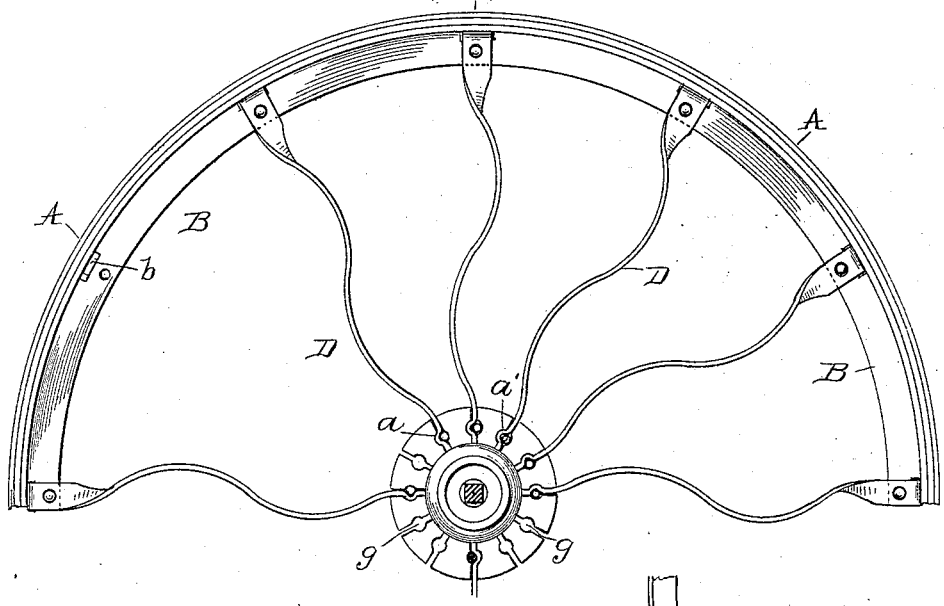
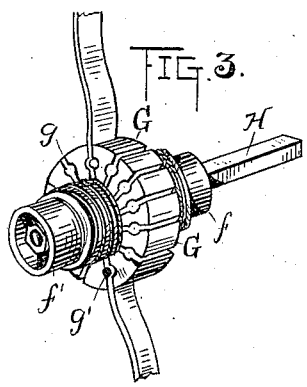
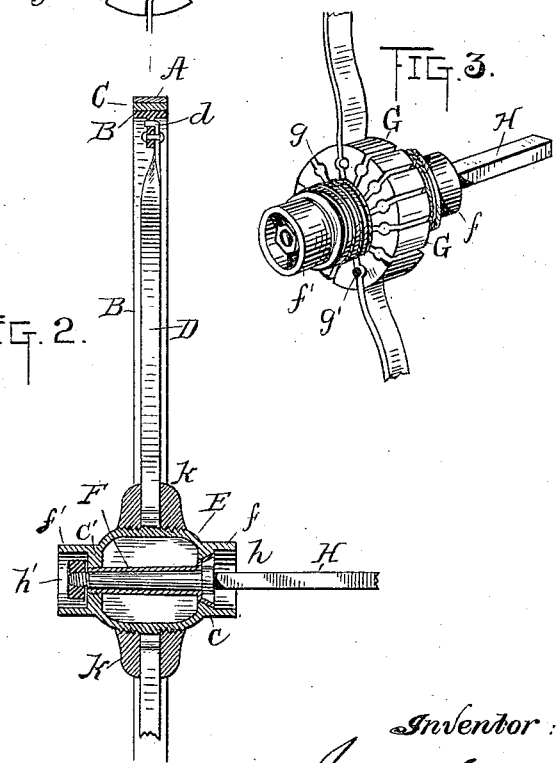
Attest:
E. C. Rowland
F. H. Davis
Inventor:
James Carpenter
G. H. W. Riddle
his Attorney

UNITED STATES PATENT OFFICE.

JAMES CARPENTER, OF BROOKLYN, NEW YORK.

VEHICLE-WHEEL.

SPECIFICATION forming part of Letters Patent No. 443,745, dated December 30, 1890.

Application filed January 28, 1890. Serial No. 338,325. (No model.)

*To all whom it may concern:*

Be it known that I, JAMES CARPENTER, of the city of Brooklyn, in the county of Kings and State of New York, have invented certain new and useful Improvements in Vehicle-Wheels, of which the following is a specification.

This invention is an improvement upon the kind of wheel described in Letters Patent granted to me December 13, 1881, No. 250,644; and it consists in the novel devices and combination of parts hereinafter described and claimed.

In the wheel of my present invention the hub, spokes, tire, and felly are constructed entirely of metal, and but for a thin strip of paper or papier-maché or other suitable material secured between the tire and the felly (which, however, it is not necessary to use unless desired) the wheel would consist wholly of metal.

In the accompanying drawings, forming a part hereof, Figure 1 is a side view of a portion of the wheel embodying my invention.
Fig. 2 is a sectional view in elevation of the same, and Fig. 3 is a perspective view of the hub and box.

A is the tire of metal. B is the felly, also of metal and made T-shaped, with the flat side next to the tire.

C is a thin strip of paper, papier-maché, or other suitable material, which is placed between the tire and the felly around the whole circumference of the wheel, so as to make the tire set more firmly onto the felly, and also for the purpose of deadening the ringing sound, (which is produced in use since the wheel is made wholly of metal,) and to prevent the tire from pounding, stretching, and drawing, and thereby loosening. The tire, felly, and interposed strip are united together by rivets in the usual manner. I can also make the tire and felly of one piece of metal and T-shaped in form by making the flat side of the T thicker in cross-section, and employing this flat side of the T as the tire instead of the separate tire, which is usually attached to the felly, as will be readily understood.

D are the spokes, which are made of metal, preferably of strips of spring-steel of any desired width and thickness, and which are bent or sprung into reverse curves, varying according to the amount of spring desired, and are twisted at their outer ends one-half way around, as shown. The extreme outer ends of the spokes are bent over at right angles, so as to form flanges $d$, which fit into mortises $b$, cut in the top of the standard of the T-shaped felly right under the flat side, (see Fig. 2,) and the spokes are then riveted to the standard of the felly, the flanges of the spoke entering the mortises in the standard of the felly, preferably from the outside, for reasons to be hereinafter set forth, or the standard of the T-shaped felly may be slightly enlarged right under the flat side, and the mortises $b$ cut directly under this enlarged portion, so that the enlargement will act as a shoulder, against which the ends of the spokes may rest. The inner extremities of the spokes to be connected with the hub are bent near the extreme end, so as to form a semicircle $a$. (See Fig. 1.)

E is the hub of metal, (see Fig. 2,) cast in the form of a hollow shell with a central rim G, (see Fig. 3,) into which the spokes are inserted, and with the heads $c$ $c'$, with openings therein for the passage therethrough of the axle-box F, and with the projecting ends $f f'$, which take the place of the protecting-bands, which are usually secured onto the ends of the hub to prevent the nut on the end of the axle from being knocked off and to keep the dirt out—that is, the hollow hub E, rim G, heads $c$ $c'$, and projecting ends $f f'$ are cast all in one piece. The box F is made slightly tapering, with the taper end on the outside, and is also screw-threaded on that end, and the other or inner end of the box is made flaring. (See Fig. 2.) The outer head $c'$ of the hub is screw-threaded on the inside, into which the taper end of the box F is screwed, and the inner head $c$ of the hub is countersunk to correspond with the flaring end of the box F, which is to be inserted into it. The axle is inserted into the box F and the nut $h'$ screwed onto the outer end, which nut is protected by the head $f'$ of the hub, and the shoulder $h$ on the axle fits into the flaring end of the box, (see Fig. 2,) thus securely fastening the axle to the hub. The rim G is preferably of the width of the spokes, and openings $g$, corresponding to the number of spokes, are milled into this rim, extending across its extreme width, and these openings are themselves in width equal to the thickness of the spokes, which are inserted into them, preferably, from the outside. As will be seen in the drawings, these openings are made with a circular portion, into which the semicircular parts of the inner bent ends $a$ of the spokes are inserted and partially fill, and these openings may be at any angle, so as to dish the wheel at any desired pitch. In order to keep the spokes from being pulled out, bolts or rivets $g'$ are driven into these openings $g$ after the spokes are inserted therein, preferably from the outside, completely filling said openings, and thereby firmly securing the spokes to the hub. In order to prevent these rivets from coming out, one end thereof may be upset, or this may be effected in the manner hereinafter set forth.

In order to prevent the spokes by any possibility from coming out sidewise from the hub by the jarring, in addition to the rivets $g'$, as above set forth, and also to finish off the hub, caps or bands K are screwed against both sides of the rim G, the upper surface of the hub being screw-threaded for that purpose, (see Fig. 2;) or these bands may be riveted or otherwise secured to the rim of the hub, as will be readily understood. As before stated, the flanges $d$ of the spokes are inserted into the felly, preferably from the outside—that is, from the same side as the inner ends of the spokes are inserted into the rim G of the hub—that is, the spokes are so contructed that they may be connected with or inserted in both the hub and felly from the same side of the wheel, either the inner or outer side, as desired, the outer side being more preferable; but in either case each spoke is independent of the other, and in case a spoke should become broken from any cause it may be taken out of the wheel and a new one inserted in its place very easily and quickly by simply unscrewing the band K and knocking out the rivet which secures the spoke to the felly and the rivet $g'$ which secures it to the hub, and without in the least interfering with the other parts of the wheel, and which cannot be done in wheels heretofore made without removing the tire or other parts of the wheel.

What I claim is—

1. In a vehicle-wheel, the combination, with the spokes having the ends which are to be united to the hub constructed with semicircular bends $a$, as shown and described, of a hub having openings $g$ therein, into which said ends of said spokes are inserted, and rivets or bolts also inserted into said openings, substantially as and for the purpose set forth.

2. In a vehicle-wheel, the combination, with the spokes having the ends which are to be united to the hub constructed with semicircular bends $a$, as shown and described, of a hub having openings $g$ therein, into which said ends of said spokes are inserted, rivets or bolts also inserted into said openings, and caps or bands secured to the hub on both sides thereof over said openings $g$, substantially as and for the purpose set forth.

3. In a vehicle-wheel, a metal felly made T-shaped or with an inner flange, and flat metal spokes bent in reverse curves and having a twist that brings their outer ends with their surfaces to the flat surface of said flange on the felly, to which they are bolted or fastened, while the other ends of said spokes have semicircular bends $a$ and are inserted into slots or openings $g$, having recesses in the metal hub G, and secured therein by pins or bolts $g'$, substantially as set forth.

4. In a vehicle-wheel, a metal felly made T-shaped or with an inner flange, and flat metal spokes bent in reverse curves and having a twist that brings their outer ends with their surfaces to the flat surface of said flange on the felly, to which they are bolted or fastened, while the other ends of said spokes have semicircular bends $a$ and are inserted into slots or openings $g$, having recesses in the metal hub G, and secured therein by pins or bolts $g'$, and caps or bands secured to the hub on both sides thereof over said opening $g$, substantially as set forth.

5. In a vehicle-wheel, the combination of a metal felly made T-shaped or with an inner flange having mortises $b$ therein, and flat metal spokes bent in reverse curves, having their outer ends bent to fit into said mortises in the felly, and said spokes having a twist that brings said outer ends with their surfaces to the flat surface of said flange on the felly, to which they are bolted or fastened, while the other ends of said spokes have semicircular bends $a$ and are inserted into slots or openings $g$, having recesses in the metal hub G, and secured therein by pins or bolts $g'$, substantially as set forth.

6. In a vehicle-wheel, the combination of a metal tire and a metal felly made T-shaped or with an inner flange having the flat side next to the tire and secured thereto, a strip of paper or other fibrous material interposed between said tire and felly, and flat metal spokes bent in reverse curves and having a twist that brings their outer ends with their surfaces to the flat surface of said flange on the felly, to which they are bolted or fastened, while the other ends of said spokes have semicircular bends $a$ and are inserted into slots or openings $g$, having recesses in the metal hub G, and secured therein by pins or bolts $g'$, substantially as set forth.

This specification signed and witnessed this 20th day of January, 1890.

JAMES CARPENTER.

Witnesses:
 GEO. H. SONNEBORN,
 E. GATTERER.